Oct. 17, 1944. J. G. LANDER 2,360,778
CLEANING THE PLATENS OF FACING MACHINES
Filed Feb. 6, 1942 2 Sheets-Sheet 1
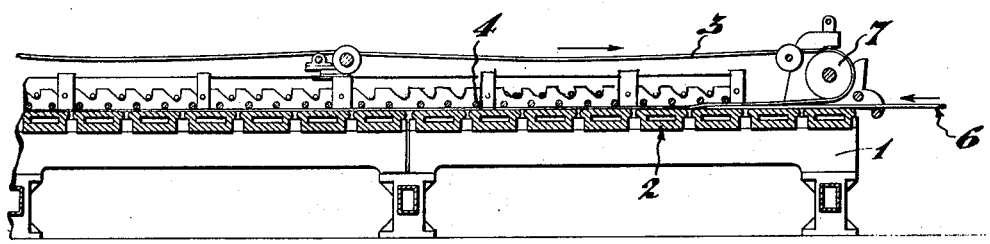
Fig. 1
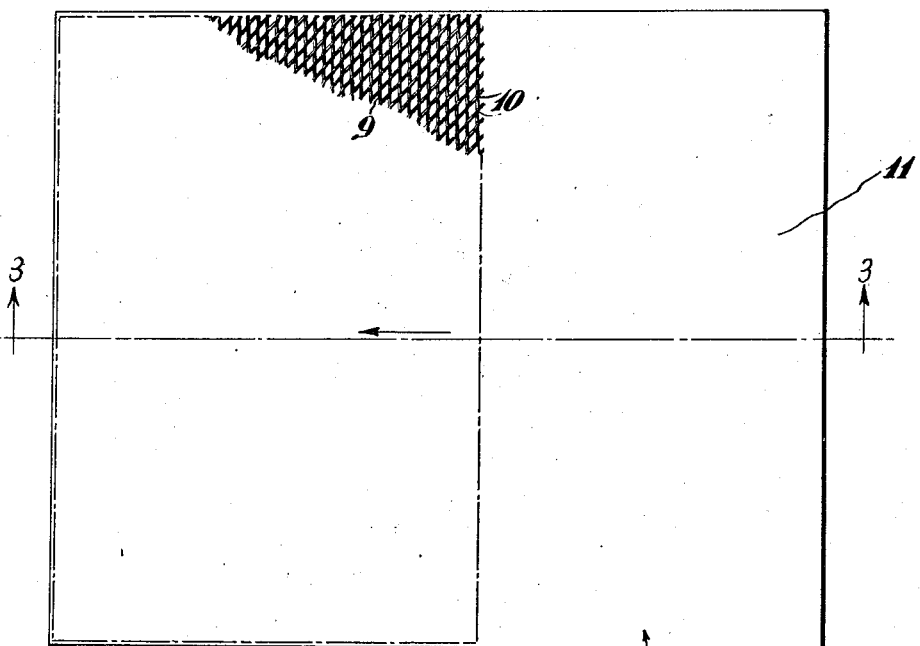
Fig. 2
Fig. 3
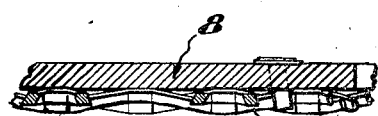
Fig. 5
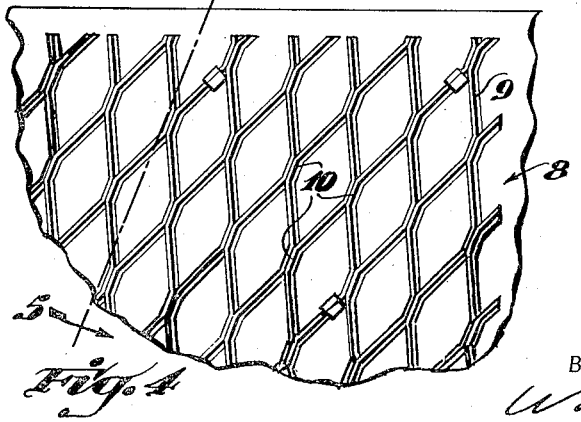
Fig. 4
INVENTOR.
James G. Lander
BY
Wood, Arey, Herron & Evans
ATTORNEYS Oct. 17, 1944. J. G. LANDER 2,360,778
CLEANING THE PLATENS OF FACING MACHINES
Filed Feb. 6, 1942 2 Sheets-Sheet 2
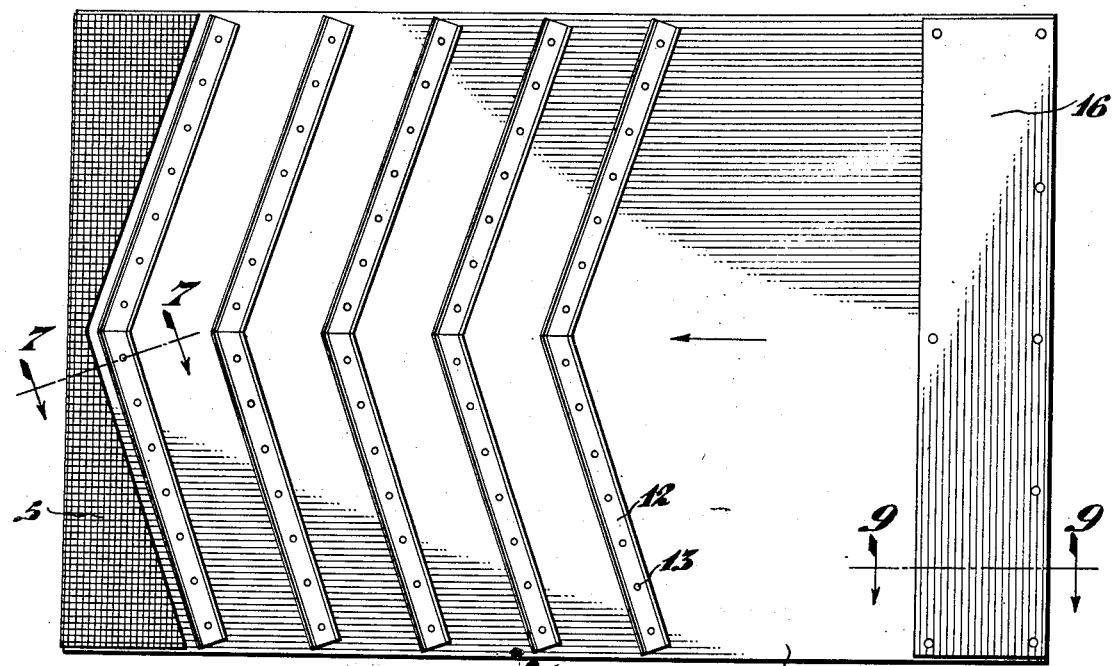
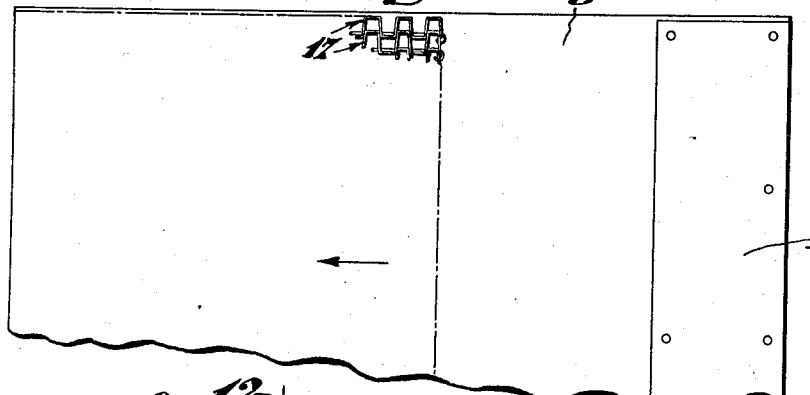
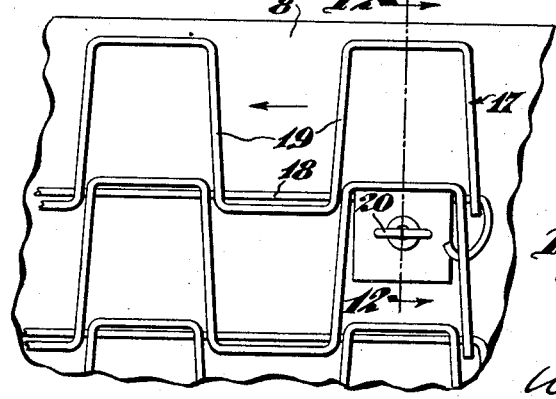
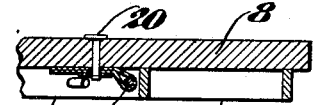
INVENTOR.
BY James G. Lander
ATTORNEYS Patented Oct. 17, 1944

2,360,778

UNITED STATES PATENT OFFICE 2,360,778

CLEANING THE PLATENS OF FACING MACHINES

James G. Lander, Cincinnati, Ohio, assignor to Diamond Alkali Company, Pittsburgh, Pa., a corporation of Delaware Application February 6, 1942, Serial No. 429,801

4 Claims. (Cl. 15—236)

This invention relates to the manufacture of laminated sheet materials such as corrugated paperboard and the like and is directed particularly to improvements in the removal of adhesive which accumulates from time to time upon the drying platens of the machines in which such articles are manufactured.

The invention is adapted particularly to a method and to apparatus used for such purposes.

In the manufacture of a product such as corrugated paperboard, adhesive is employed for uniting the facing material with the corrugated sheet. Following the application of the adhesive the layers are brought into laminated relationship and are then passed over a series of heated platens at which the temperature is elevated to facilitate drying the adhesive. As the web passes over the platens pressure is exerted on it so as to bring the corrugated web into contact with the "liner" or facing. It is necessary that the adhesive be applied somewhat profusely in order to insure good bond between the layers. However, under the pressure to which the web is subjected, some of the adhesive is squeezed outwardly from the edges and oozes onto the platens, accumulating, over a period of time, into substantial mounds or ridges. When the adhesive is a silicate it dries at the elevated platen temperature into a very hard and rock-like condition.

From time to time it is necessary that these accumulations be removed from the platen surfaces; otherwise they accumulate to such a degree that the edges of the moving sheet are marred. It is also necessary that these accumulations be taken off whenever a sheet of greater width is to be made on the machine inasmuch as the accumulations would prevent the sheet of greater width from coming into contact with the platen surface and would mar or tear or peel the surface of the web. It is not unusual for a paperboard machine to be readjusted several times a day or more to make sheets of various widths.

The adhesion of silicates of the adhesive grade to the platen surfaces is so great that the problem of removing the accumulations is very difficult and tedious. A typical facing machine of the kind used in the corrugated boxboard industry may have as many as thirty platens. Each heretofore has been scraped by hand and then polished. It can be seen that this cleaning operation consumes a great deal of time during which the entire machine is unproductive.

In a copending United States patent application, Serial No. 421,847, I have disclosed an improvement in the chemical composition of silicate adhesives which does not impair their adhesive quality but which renders such compositions less adherent to the metal surfaces of the platens. In that application the use of so-called foaming agents is disclosed as a means of producing a more friable condition in the silicate adhesives when they have been heated to the elevated temperature at which the platens are maintained. Under such conditions the silicate accumulations are broken up and scraped from the platen surfaces very much more easily than heretofore has been possible.

The present invention is directed particularly to a method and mechanical means for clearing such accumulations from the platens.

The typical facing machine is provided with a belt which moves continuously over the platen surfaces; this belt serves the purpose of advancing the web and also serves as the means for distributing pressure on the web from pressure rolls which contact the belt. In accordance with the present invention a partially flexible scraping device is interposed between the belt and the platens so as to be advanced over the platen surfaces by the belt to remove the silicate accumulations. This device preferably is yieldable or jointed so as to be free to distort out of its plane of configuration and thus accommodate itself to variations in the thickness of the adhesive being scraped away. At its one face means constituting a plurality of scraping edges are provided; these are adapted to engage the platen surfaces and scrape away the silicate accumulations as these edges move over the surface. The opposite face of the scraping device is constructed so as to be engaged by the belt and thus carried through the machine without marring the belt surface.

In terms of practical embodiments the scraping device can be constructed in a number of different ways. Several such structures are shown in the drawings and others will present themselves to those skilled in the art upon understanding the principles of the invention which have been described as well as the details of structure of typical embodiments which follow.

In the drawings:

Figure 1 is a view diagrammatically illustrating the platen and pressure roll section of a facing machine.

Figure 2 is a plan view of a rough scraping device constructed in accordance with the present invention.

Figure 3 is a sectional view taken on the line 3—3 of Figure 2.

Figure 4 is an enlarged view of a scraper of the type shown in Figure 2.

Figure 5 is a sectional view taken on the line 5—5 of Figure 4.

Figure 6 is a plan view of another type of scraping device.

Figure 7 is a sectional view taken on the line 7—7 of Figure 6.

Figure 8 is a modified form of a scraper blade of the general type shown in Figure 7.

Figure 9 is a sectional view taken on the line 9—9 of Figure 6.

Figure 10 is a plan view of another scraper device constructed in accordance with the invention.

Figure 11 is an enlarged view similar to Figure 10.

Figure 12 is a sectional view taken on the line 12—12 of Figure 11.

The section or portion of the facing machine at which the scraping devices of the present invention are adapted to be employed consists, as shown in Figure 1, of a bed or plurality of bed portions 1 arranged to support platens indicated generally at 2. There are many of these platens in the machine as previously indicated, twenty-five, thirty or more. The platens reside adjacent one another with the platen surfaces arranged in a plane so that the web of material being manufactured is free to slide over them. The platens are heated, usually by steam, for the purpose of elevating the temperature of the web during its passage and thereby driving moisture from the adhesive and uniting the laminations thereof. Superimposed over the platens is a continuously travelling belt 3 and many pressure rolls 4 are carried in a superstructure so as to press the travelling belt 3 toward the platen surfaces. In this manner pressure is applied upon the web to unite the laminations. It is this pressure which gives rise to the squeezing of adhesive from the edges of the web. The pressure rolls 4 usually exert their dead weight upon the belt though they may be spring actuated. However, they are usually free to rise.

The web 6 enters the platen section of the machine at one end thereof and is advanced over the platens by frictional engagement of its one surface with the travelling belt, and the belt, in turn, at the feed end of this section is supported over a roller 7 which is so arranged that the belt converges toward the platens as it passes under the first pressure roll. Between the roller 7 and the first pressure roll a clearance space is provided into which the scraping devices of the present invention can be interposed between the belt and the platen surfaces.

The scraper shown in Figure 2 in plan view is of a kind which is adapted especially for removing the worst of the accumulations of adhesive from the platen surfaces and it consists preferably, as shown in Figure 5, of a flexible member 8 to one face of which is fastened a sheet of expanded metal 9. The web 8 can be constructed of rubber or heavy canvas belting, or other suitable materials of a less flexible nature. It should be sufficiently strong and thick in cross-section as to provide ample support for the attachment of the expanded metal to it. The expanded metal in turn is of a conventional type but preferably is arranged so that the axes through the elongated diamond shaped apertures extend somewhat diagonally of the web 8. The interconnecting webs, of which this expanded metal is comprised, present cutting edges 10.

As shown in Figure 5, cleats pass at suitable intervals over the webs of the expanded metal and through the belt 8 where they are bent over so as to fasten the scraping element to the web by which it is supported. In using this structure the web 8 is arranged with its surface in contact with the travelling belt 3 and the opposite surface resides in engagement with the platens. When the pressure belt 3 is advanced it drags the scraper across the platens and during this passage the cutting edges exert their scraping action to detach the silicate accumulations.

The scraping device shown in Figure 2 also preferably is arranged so that it extends transversely of the machine so as to be advanced therethrough in the direction shown by the arrow. Thus, a plurality of cutting edges extend transversely across the platens and another series of cutting edges extend laterally thereof in skewed relationship. This arrangement facilitates efficient scraping and cutting away of the accumulations of adhesive.

It is desirable to mount the expanded metal upon a backing web 8 which is sufficiently long to provide a tail portion 11 following the scraper section. This tail portion acts as a sweeper conveying, with the scraper, the detached particles of adhesive as it passes through the machine.

The device shown in Figure 6 consists of a web 8 of belting or the like, as previously described, upon which a plurality of scraper blades are mounted in skewed relationship. This type of scraper is particularly suitable for use after the worst of the silicate accumulations have been removed; it, therefore, may be termed a finishing scraper.

The blades 12 are fastened to the support 8 by split rivets 13 or in other suitable manner. Each of the blades 12 is preferably of channel configuration, either as shown in Figure 7 or in Figure 8. Blades are preferably mounted in V formations with their sidewise portions trailing the center portions.

Satisfactory results have been obtained when the leading edge 14 of each blade is in the advancing relationship as shown in Figure 7 or in the receding relationship as shown in Figure 8. In the first case the advancing edge 14 acts to cut the adhesive from the metal, while the receding edge 15 catches the cuttings and urges them toward the edges of the platens whence they are discharged. In the opposite arrangement, shown in Figure 8, the forward and rearward edges act as scrapers.

In the preferred structure the supporting member 8 is reenforced as at 5 by wire so as to prevent undue wear upon it. The accumulations of adhesive may be very sharp and therefore tend to cut the leading edge of the base piece 8. This protection avoids such damage. Moreover, the forward edge acts as a lead for conveying the scraper over the spaces between the platens.

The trailing edge of the scraping device at Figure 6 also is provided with a wiper portion 16. This portion may be of canvas or fabric and wipes the platen surfaces clean during its passage over them. Abrasive materials such as emery paper or knit wire may be applied to the face of the wiper portion 16 so that this portion of the device polishes the surfaces of the platens as it passes over them.

It is to be noted that the scraper blades 12 in this embodiment are quite rigid in a direction substantially parallel to the cutting edges but are held in flexible relationship in a direction transverse to the cutting edges. This enables the scraper to accommodate itself to, yet exert a scraping action upon, undulating ridges of adhesive accumulations.

In another form of scraper strips of metal are bent into corrugations as shown in Figure 11. These configurated strips are arranged in a generally nested relationship and the strips are pivotally interconnected. Thus, the corrugated strips 17 are arranged flatwise upon the belt 3. With these strips positioned in complementary relationship they are interconnected by the pivot rods 18. Each corrugated strip presents cutting edges 19 which preferably are ground to sharp condition by surface grinding the cutting face of the device. A scraper of this type is fastened most conveniently to the support piece 8 by means of straps which extend around the joint rods 18 and against the underneath face of the support member so as to be riveted thereby by means of rivets 20. The base piece 8 also is provided with a trailing sweep portion as previously described.

A device of the kind shown in Figure 11 is useful for both rough and finished scraping operations. An improved result also is obtained when the scraping face is surface ground so as to sharpen the scraping edges. A unit of this kind passes freely over the spaces between the platens and is capable of providing a clean surface in one or two passes through the machine.

While each of the scrapers shown in the drawings has been illustrated as an individual unit the various forms can be combined as, for example, the expanded metal type arranged at the leading edge of a base piece followed by the finish scraper blades and by the wiper portion. In using any of these devices they are interposed between the pressure belt 3 and the platen surfaces, then the pressure belt 3 is driven to advance the scraping blades over the platen surfaces. One or two passages usually is sufficient to effect the desired detachment of accumulations of adhesive especially if the adhesive be a silicate of the type described in my aforesaid copending patent application. This method cleans the platens in but a fraction of the time heretofore required.

Having described my invention, I claim:

1. A scraping device for removing accumulations of dried adhesive from the platens of a facing machine having a number of platens arranged in line beneath a pressure belt, said device comprising a web of flexible material having metallic blade members projecting from one face thereof, said device being insertable between said belt and platens with the blade members down for contact with the platens and with the other side of said web frictionally engaged by said belt whereby to advance the device over the line of platens to scrape the latter, said blade members including portions set diagonally to the line of advance and being laterally open so as to act to clear the scrapings laterally of the device.

2. A device according to claim 1 wherein said scraping portions are parts of an open-work fabric.

3. A device according to claim 1 wherein said scraping portions are constituted by substantially parallel depressed portions of an expanded metal sheet.

4. A device according to claim 1 wherein said blade members include scraping portions which respectively are inclined toward opposite sides of the device from a substantially central line extending longitudinally thereof.

JAMES G. LANDER.